(12) United States Patent
Spry et al.

(10) Patent No.: US 11,401,023 B2
(45) Date of Patent: Aug. 2, 2022

(54) AIRCRAFT CARGO FLOOR ARCHITECTURE AND METHOD OF MODIFYING THE AIRCRAFT CARGO FLOOR ARCHITECTURE

(71) Applicant: The Boeing Company, Chicago, IL (US)

(72) Inventors: Michael D. Spry, Seattle, WA (US); Mark A. Ulvin, Brier, WA (US)

(73) Assignee: THE BOEING COMPANY, Chicago, IL (US)

( * ) Notice: Subject to any disclaimer, the term of this patent is extended or adjusted under 35 U.S.C. 154(b) by 328 days.

(21) Appl. No.: 16/246,345

(22) Filed: Jan. 11, 2019

(65) Prior Publication Data

US 2020/0223529 A1 Jul. 16, 2020

(51) Int. Cl.
*B64C 1/20* (2006.01)
*B64C 1/06* (2006.01)

(52) U.S. Cl.
CPC ............... *B64C 1/20* (2013.01); *B64C 1/061* (2013.01)

(58) Field of Classification Search
CPC .. B64C 1/20; B64C 1/22; B64C 1/061; B64D 9/003; B64D 9/00
See application file for complete search history.

(56) References Cited

U.S. PATENT DOCUMENTS

| | | | | |
|---|---|---|---|---|
| 4,824,050 A * | 4/1989 | Courier | ..................... | B64C 1/20 108/55.1 |
| 5,090,639 A * | 2/1992 | Miller | ..................... | B64D 9/00 244/118.1 |
| 6,517,028 B2 | 2/2003 | Huber | | |
| 7,004,080 B2 * | 2/2006 | Creighton | .......... | B61D 27/0081 105/404 |
| 7,770,844 B2 * | 8/2010 | Chrissos | .................. | B64D 9/00 244/118.1 |
| 7,954,760 B2 * | 6/2011 | Griess | ...................... | B64C 1/20 244/118.1 |
| 8,286,918 B2 | 10/2012 | Huber et al. | | |
| 8,424,803 B2 * | 4/2013 | Benthien | ............... | B64D 9/003 244/118.1 |
| 8,439,307 B2 * | 5/2013 | Westphal | .................. | B64C 1/18 244/121 |

(Continued)

FOREIGN PATENT DOCUMENTS

DE 102015104230 A1 9/2016
EP 1179472 A2 2/2002

(Continued)

OTHER PUBLICATIONS

Author Unknown, Telair International, Information Sheet for "A320 Family Modular Cargo System," date unknown, 1 pg.

(Continued)

*Primary Examiner* — Richard R. Green
*Assistant Examiner* — Madison Elizabeth Dittner
(74) *Attorney, Agent, or Firm* — MH2 Technology Law Group LLP

(57) ABSTRACT

An aircraft cargo floor architecture comprises a plurality of aircraft keel frames. One or more longitudinal rails are attached directly to the aircraft keel frames. The one or more longitudinal rails are designed to provide structural support for an aircraft cargo floor.

20 Claims, 11 Drawing Sheets

(56) References Cited

U.S. PATENT DOCUMENTS

| | | | |
|---|---|---|---|
| 8,561,946 B2* | 10/2013 | Barmichev | B64C 1/20 244/118.1 |
| 9,314,974 B2 | 4/2016 | Buttrick et al. | |
| 10,099,765 B2* | 10/2018 | Paci | B29C 70/30 |
| 2007/0176048 A1* | 8/2007 | Huber | B64C 1/18 244/119 |
| 2011/0215198 A1 | 9/2011 | Panzram et al. | |
| 2015/0041048 A1 | 2/2015 | Anderson et al. | |
| 2018/0111689 A1 | 4/2018 | Huber et al. | |

FOREIGN PATENT DOCUMENTS

| | | | |
|---|---|---|---|
| EP | 2228298 A1 | 3/2010 | |
| EP | 2441668 A2 | 4/2012 | |
| GB | 858596 A * | 1/1961 | B64D 9/00 |
| WO | 2010-046276 A2 | 4/2010 | |
| WO | WO 2016/150908 A1 | 9/2016 | |

OTHER PUBLICATIONS

Author Unknown, "Telair International, Product Sheet for A320 Family Narrow Body Aircraft," date unknown, 1 pg.

Anderson et al., "End Effector for Forming Prepreg Plies on Highly Contoured Surfaces," U.S. Appl. No. 16/022,013, filed Jun. 28, 2018.

Extended European Search Report dated Mar. 18, 2020 in corresponding European Application No. 9196909.5, 7 pages.

* cited by examiner

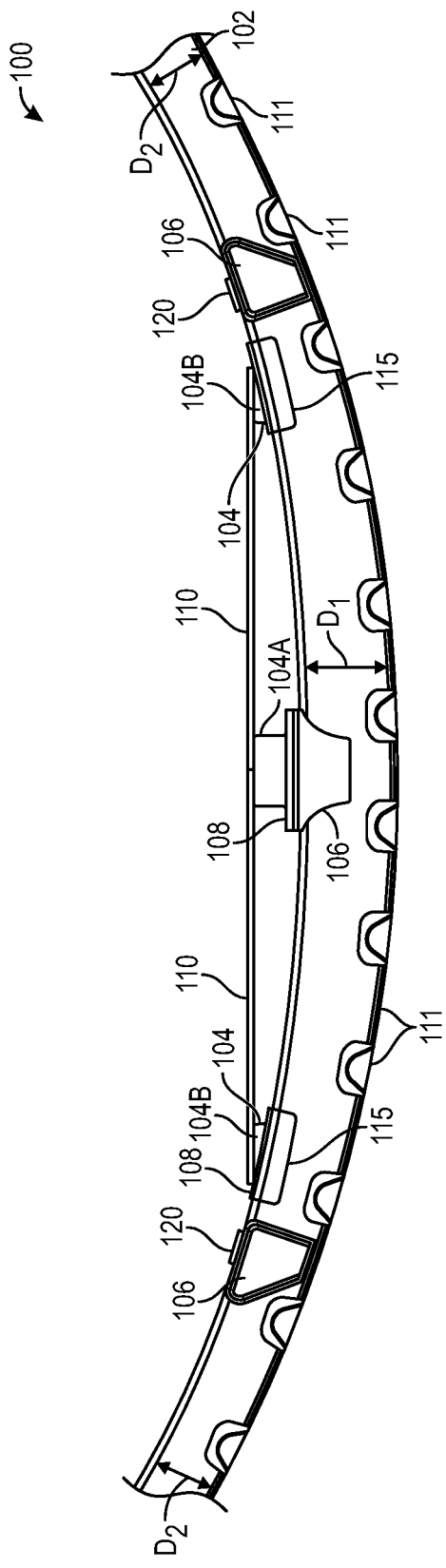
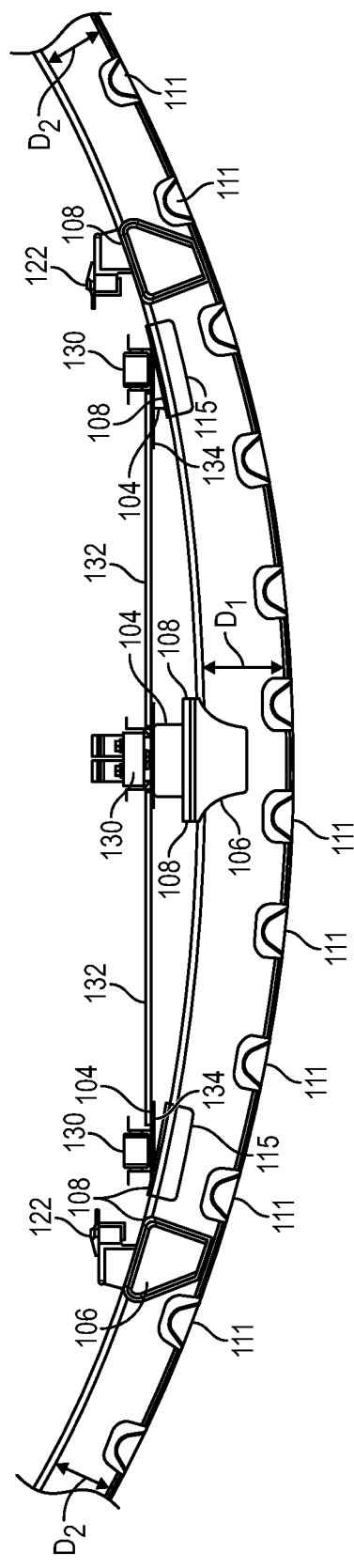
FIG. 2A
FIG. 2B

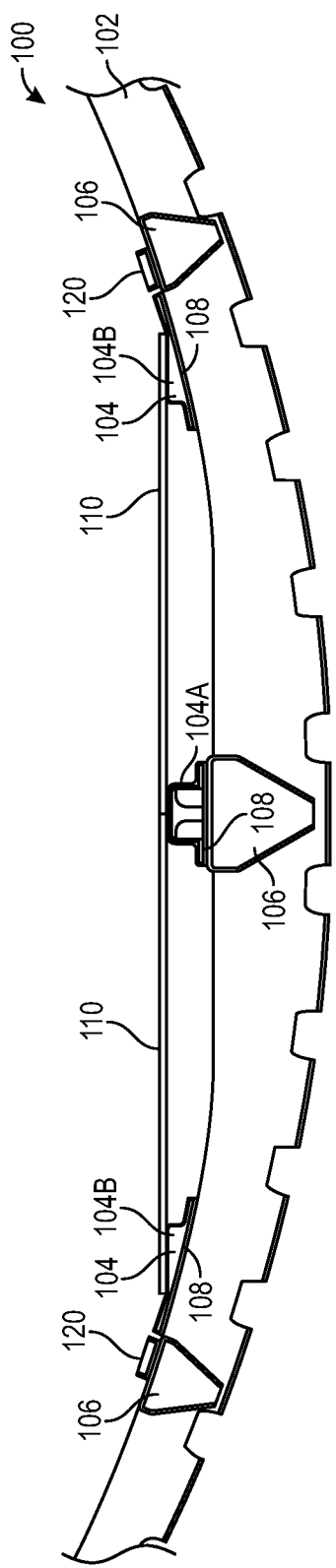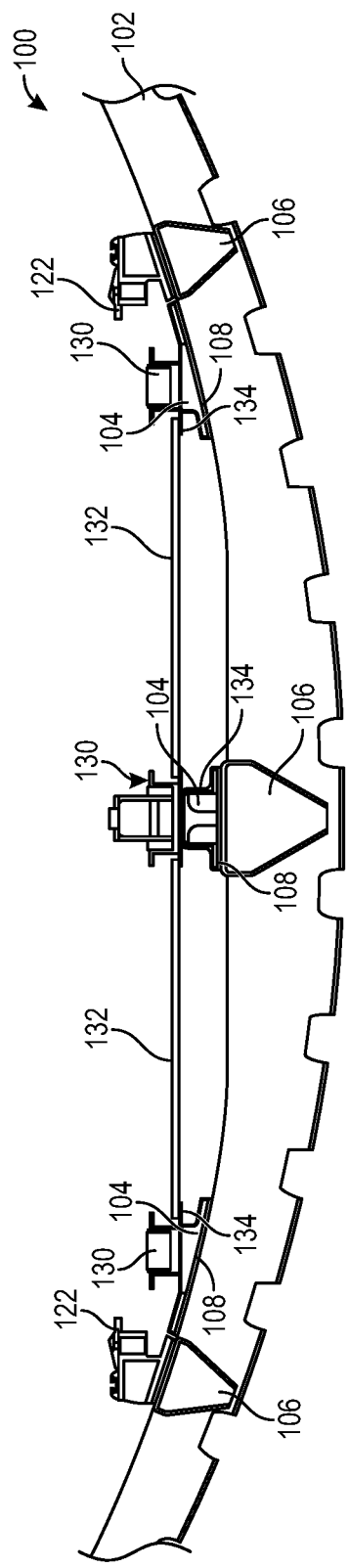

AIRCRAFT CARGO FLOOR ARCHITECTURE AND METHOD OF MODIFYING THE AIRCRAFT CARGO FLOOR ARCHITECTURE

DETAILED DESCRIPTION

Field of the Disclosure

The present disclosure is directed to an aircraft cargo floor architecture and a method of modifying the aircraft cargo floor architecture.

Background

Aircraft in the field are configured with different cargo floor configurations depending on their desired use. Two such configurations include bulk cargo floors and containerized cargo floors. Sometimes it is desirable to modify the cargo floor configuration of an aircraft. However, because bulk cargo floors and containerized cargo floors can have significant variability in their underlying support structures, the cost and time for changing between these different cargo floor configurations can be significant.

FIG. 1A illustrates a conventional monocoque bulk cargo floor structure. The bulk cargo floor structure includes cargo floor beams 2 and stanchions 4 that are attached to an aircraft keel frame 6 for structurally supporting the cargo floor beam. Stringers 8 are supported by the cargo floor beam and in turn provide structural support for the bulk cargo floor panel 10. FIG. 1B illustrates a conventional monocoque containerized cargo floor structure. The containerized cargo floor structure also includes cargo floor beams 2 and stanchions 4 that are attached to an aircraft keel frame 6 for structural support. Instead of stringers and a bulk cargo floor panel, the containerized cargo floor includes roller trays 20 that are supported by the cargo floor beams 2. Side guide fittings 22 are also employed. Thus, changing between a bulk cargo floor structure and a containerized floor structure can include removal or addition of structural components, such as the stringers 8. Further, the side guide fittings 22 are not conventionally made for easy removal.

Thus, there is a need in the art for novel architectures that allow for quickly changing between a bulk cargo floor configuration and a containerized cargo floor configuration at relatively low cost.

SUMMARY

The present disclosure is directed to an aircraft cargo floor architecture. The cargo floor architecture comprises a plurality of aircraft keel frames. One or more longitudinal rails are attached directly to the aircraft keel frames. The one or more longitudinal rails are designed to provide structural support for an aircraft cargo floor.

The present disclosure is also directed to an aircraft cargo floor architecture system. The system comprises a plurality of aircraft keel frames. One or more longitudinal rails are attached directly to the aircraft keel frames. The one or more longitudinal rails are designed to provide structural support for both a bulk cargo floor and a containerized cargo floor.

The present disclosure is also directed to a method of modifying an aircraft cargo floor architecture. The aircraft cargo floor architecture comprises a plurality of aircraft keel frames and one or more longitudinal rails attached directly to the aircraft keel frames. The method comprises removing parts of a first cargo floor configuration from the aircraft cargo floor architecture. Parts of a second cargo floor configuration are then attached to the aircraft cargo floor architecture It is to be understood that both the foregoing general description and the following detailed description are exemplary and explanatory only and are not restrictive of the present teachings, as claimed.

BRIEF DESCRIPTION OF THE DRAWINGS

The accompanying drawings, which are incorporated in and constitute a part of this specification, illustrates aspects of the present teachings and together with the description, serve to explain the principles of the present teachings.

FIG. 2A illustrates an aircraft cargo floor architecture configured for bulk loaded cargo, according to an aspect of the present disclosure.

FIG. 2B illustrates an aircraft cargo floor architecture configured for containerized cargo, according to an aspect of the present disclosure.

FIG. 11A illustrates an aircraft cargo floor architecture configured for bulk loaded cargo, according to an aspect of the present disclosure.

FIG. 11B illustrates an aircraft cargo floor architecture configured for containerized cargo, according to an aspect of the present disclosure.

Figure 1A:
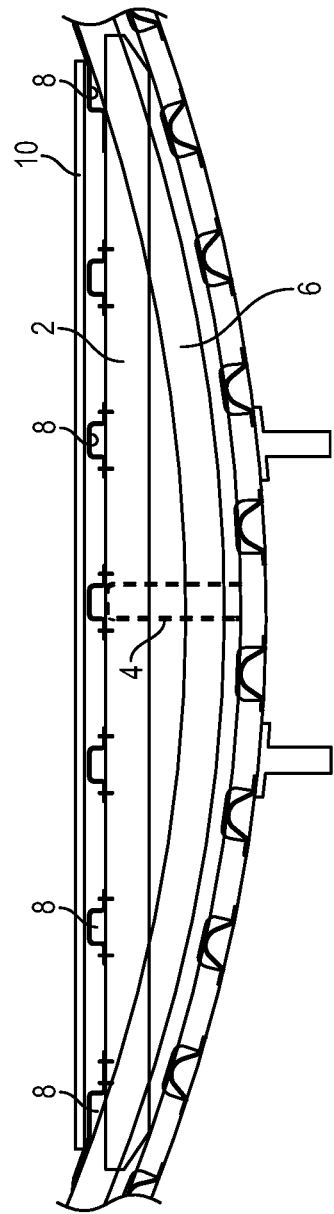
FIG. 1A illustrates a conventional bulk cargo floor structure.

It should be noted that some details of the figures have been simplified and are drawn to facilitate understanding rather than to maintain strict structural accuracy, detail, and scale.

DESCRIPTION

Reference will now be made in detail to the present teachings, examples of which are illustrated in the accompanying drawings. In the drawings, like reference numerals have been used throughout to designate identical elements. In the following description, reference is made to the accompanying drawings that form a part thereof, and in which is shown by way of illustration specific examples of practicing the present teachings. The following description is, therefore, merely exemplary.

Figure 1B:
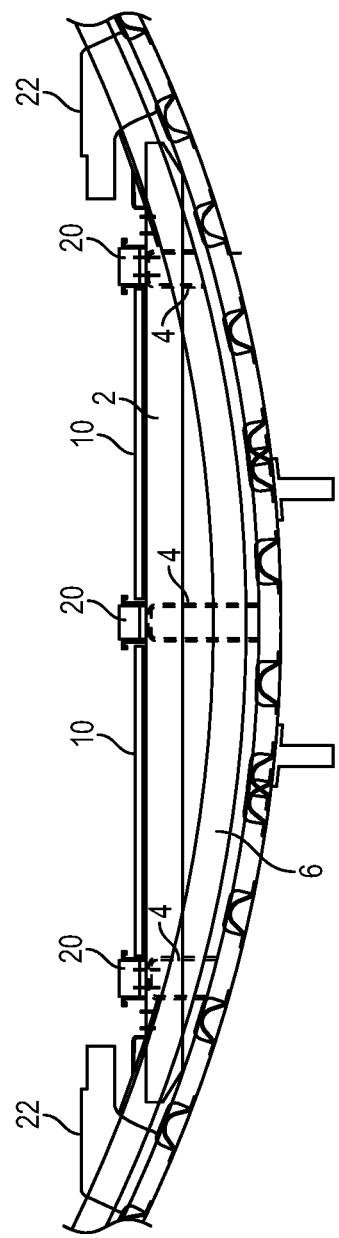
FIG. 1B illustrates a conventional containerized cargo floor structure.

FIGS. 2A and 2B illustrate an aircraft cargo floor architecture 100 that can support both a bulk loaded cargo floor (FIG. 2A) or a containerized loaded cargo floor (FIG. 2B). The aircraft cargo floor architecture 100 comprising a plurality of aircraft keel frames 102. One or more longitudinal rails 104 are attached directly to the aircraft keel frames 102. The phrase "attached directly to the aircraft keel frames", or "attached directly to the keel frames" is defined herein to mean that there is no intervening support beam or keel frame extension between the keel frames and the longitudinal rails, but that attachment hardware, such as bathtub fittings, thermal isolators and other such hardware, can be positioned between the keel frames and the longitudinal rails, or alternatively, that the keel frames can be in direct physical contact with the longitudinal rails. The aircraft cargo floor architecture 100 eliminates planar cargo floor beams and/or extended frames attached at every monocoque fuselage frame, such as those illustrated in FIGS. 1A and 1B. Longitudinal intercostals and lateral shear webs between cargo floor beams can also be eliminated.

The keel frames 102 can have any suitable design. As an example, the keel frames 102 can have a variable depth design, such as where the lower portion of the keel frame 102 has a depth $D_1$ that is greater than the depth, $D_2$, of the side portions of the keel frame, as illustrated in FIGS. 2A and 2B. Other suitable variable depth designs for keel frames are shown in FIGS. 11A and 11B. Variable depth keel frames are generally known in the art. Alternatively, the keel frames do not have a variable depth design, but instead can have a depth that is the same along the length of the keel frames (e.g., D1 and D2 are the same).

The keel frames 102 can comprise any suitable material, such as metals, composite materials and so forth. As an example, the keel frames 102 can comprise a carbon fiber reinforced plastic.

The longitudinal rails 104 provide a surface to attach either bulk floor panels or containerized cargo system roller trays. The surface of longitudinal rails 104 can be planar or have any other suitable surface configuration. The aircraft cargo floor architecture 100 can include any desired number of longitudinal rails 104, which number may vary depending on such factors as the weight of the cargo to be carried, the width of the aircraft and so forth. In general, fewer longitudinal rails can allow for one or more advantages, such as lower aircraft weight, ease of changing between a bulk cargo floor configuration and a containerized cargo floor configuration, and ease of access to aircraft components in the space below the floor, which may include wiring, hydraulics and other components. As an example, the number of longitudinal rails 104 can range from 1 to 5, such as 1 to 4 or 1 to 3.

The longitudinal rails 104 are designed and sized to bear cargo loads. For example, the longitudinal rails 104 can be designed to support 30 pounds/inch to 120 pounds/inch.

Figure 3:
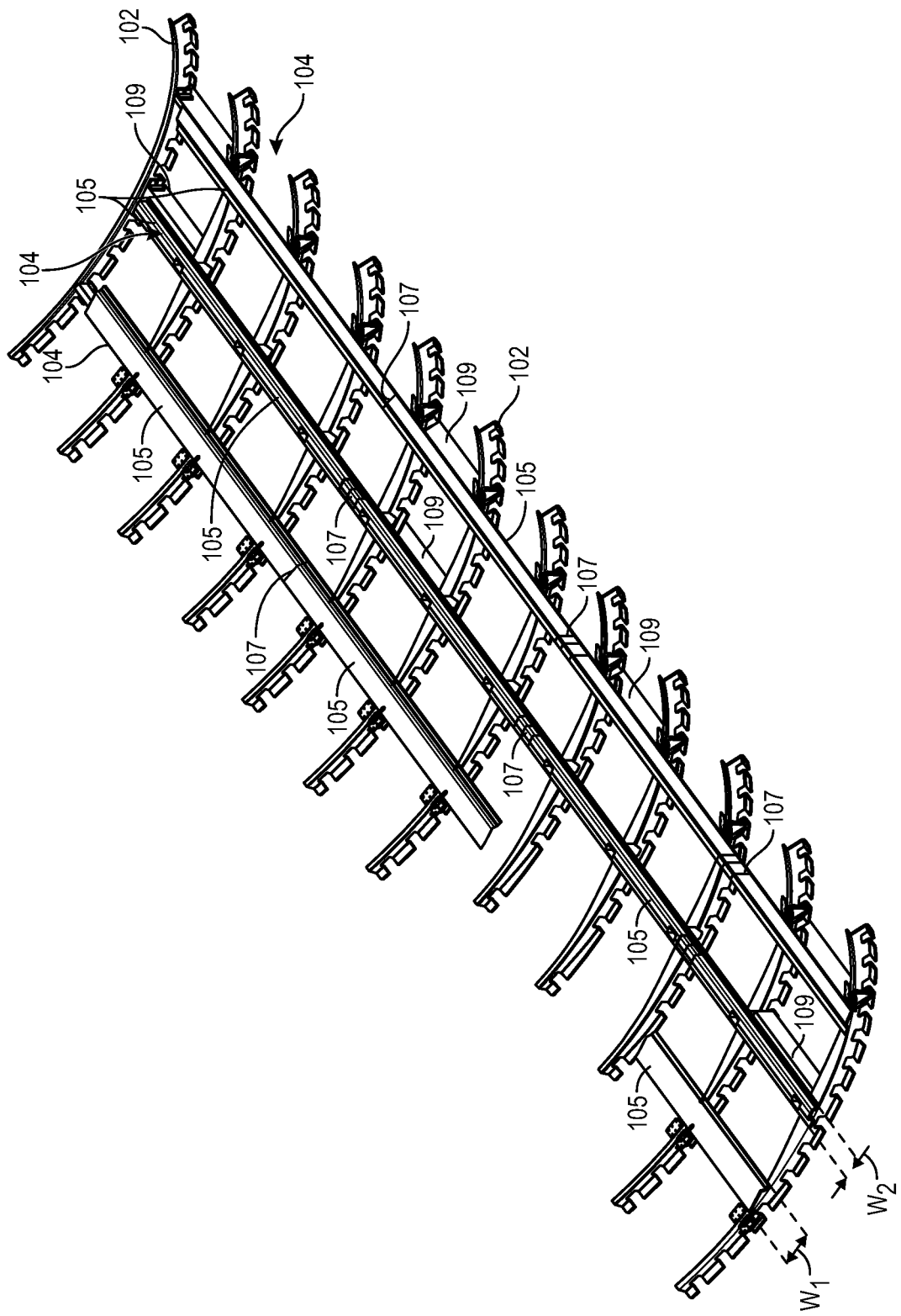
FIG. 3 illustrates a perspective view of one or more longitudinal rails attached to the keel frames, according to an aspect of the present disclosure.

FIG. 3 illustrates a perspective view of the one or more longitudinal rails 104 attached to the keel frames 102. Each longitudinal rail 104 comprises an assembly of a plurality of rail subsections 105 that are connected at rail joints 107. Rail joints 107 allow the longitudinal rail 104 to flex with the aircraft during flight, thereby avoiding or reducing physical damage to the longitudinal rails 104 or the aircraft keel frames 102. The length of each subsection 105 can be any length that provides for the desired flexibility of the longitudinal rail 104 while still retaining suitable strength of the longitudinal rail for supporting cargo. For example, the length of each subsection 105 can range from about 0.5 meters to about 6 meters, such as about 1 meter to about 3 meters. The rail joints 107 can be any suitable type of joint for connecting the rail subsections 105, such as, for example, a slip joint.

Intercostals 109 can be employed under portions of the longitudinal rails 104 between adjacent keel frames 102. The intercostals 109 are connected to the skin (shown at 111 in FIGS. 2A and 2B) of the aircraft and can support the longitudinal rails 104 and keel frame 102. In particular, intercostals 109 can react fore and aft loads applied by the cargo to the longitudinal rails 104 during flight via bulk tie-downs and/or container restraints, depending on the cargo configuration. In an example, one or more intercostals 109 are disposed under each rail subsection 105, such as one, two, three or more intercostals. In an example, a single intercostal 109 is employed under each rail subsection 105.

The longitudinal rails 104 can be made of any material that is suitably strong for supporting the desired cargo weight load capacity without excessively increasing the weight of the aircraft. Examples of suitable materials include, metals, composites and so forth, such as a metal comprising titanium (e.g., pure titanium or a metal alloy including titanium). For instance, the rail can comprise a roll form sheet of titanium or titanium alloy.

Referring back to FIG. 2A, in an implementation at least one inner longitudinal rail 104A is attached directly to the keel frames 102. Multiple inner longitudinal rails, such as two, three or more, can be employed. The at least one inner longitudinal rail 104A can be attached to the keel frame 102 by any suitable means, such as by using a bathtub fitting 106. The bathtub fittings described herein can comprise any suitable material, such as a metal or composite. An example of a composite material is a carbon fiber reinforced plastic. Any other suitable known or later developed attachment mechanism could be employed in place of the bathtub fitting 106. A first outer longitudinal rail 104B and a second outer longitudinal rail 104B can both be attached directly to the aircraft keel frames, such as to the inner cord of the keel frames as illustrated in FIG. 2A. The first outer longitudinal rail 104B can be positioned on one side of the inner longitudinal rail 104A and the second outer longitudinal rail 104B positioned on the other side of the inner longitudinal rail 104A. The outer longitudinal rails 104B can be attached to the aircraft keel frames 102 using any suitable attachment mechanism, such as, for example by using clips 115 and/or by using other suitable fasteners, such as bolts with nuts, rivets or other conventional mechanical fasteners.

The width dimensions of the inner rail 104A can be any suitable dimensions, such as a width, W1, ranging from about 2 inches to about 8 inches. The width dimensions of the outer longitudinal rails 104B can be any suitable dimensions, such as a width, W2, ranging from about 4 inches to about 12 inches.

Thermal isolators 108 can be positioned between the one or more longitudinal rails 104 and any composite or plastic parts, such as the keel frames 102 and/or bathtub fittings 106, that can be damaged by heat. The thermal isolators 108 provide thermal protection by providing separation between the longitudinal rails and the variable depth frames. Thermal isolators 108 can comprise any desired heat and/or flame resistant material. An example of a known material for thermal isolators is phenolic impregnated fiber glass layer.

Figure 4:
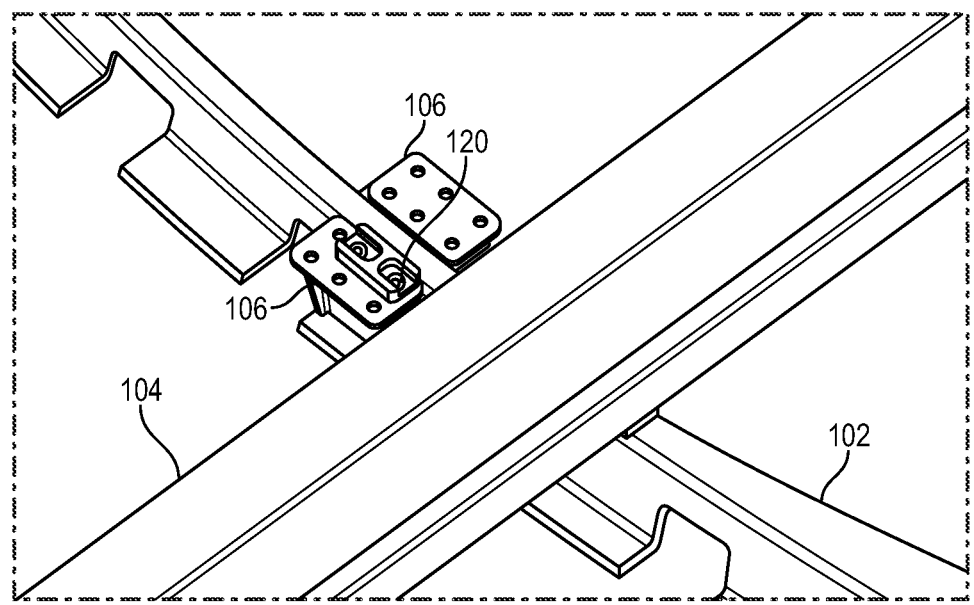
FIG. 4 illustrates a close up view of a bulk cargo tie-down receptacle attached to a keel frame, according to an aspect of the present disclosure.
Figure 5:
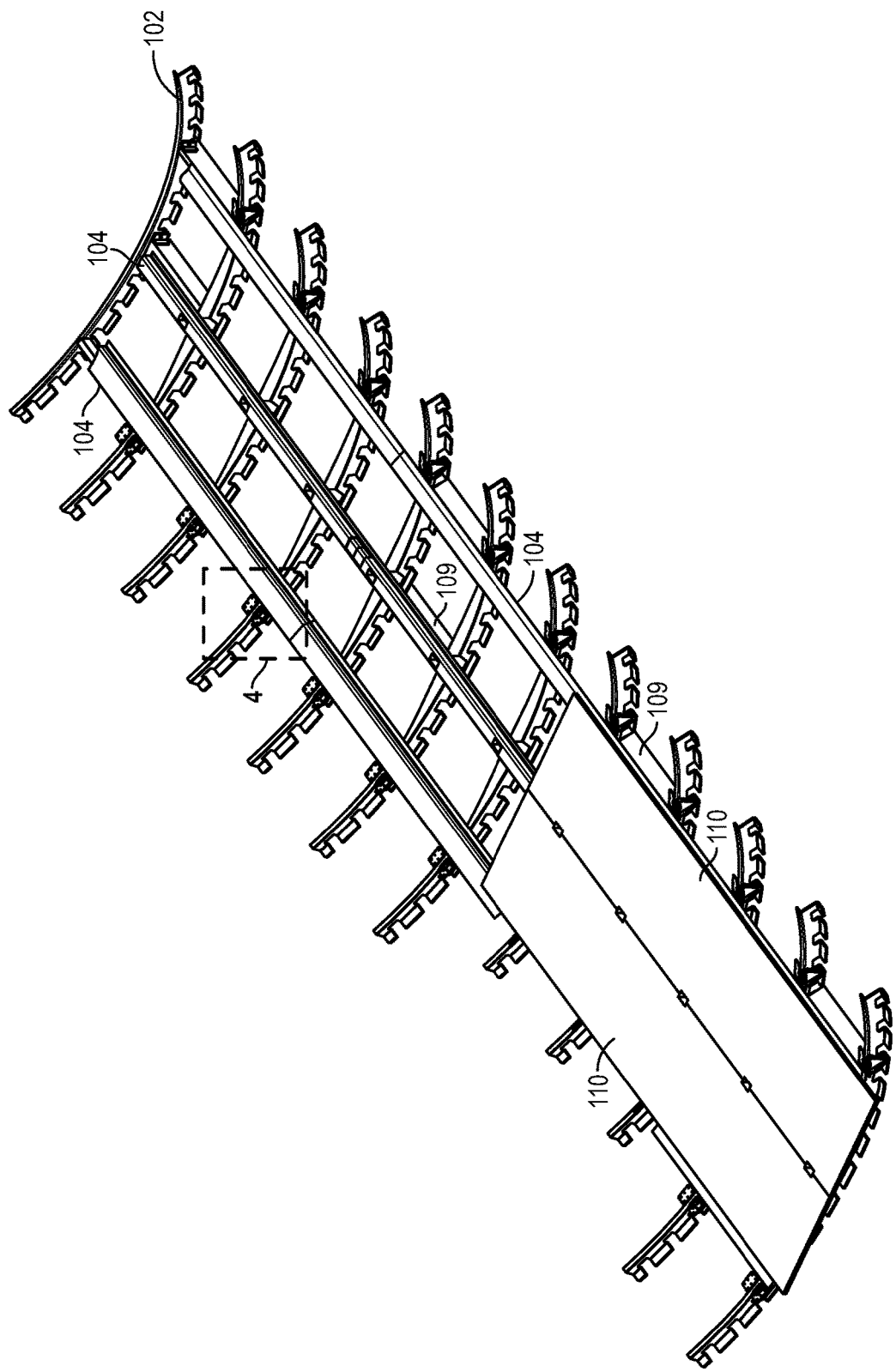
FIG. 5 illustrates a bulk loaded cargo floor comprising bulk cargo floor panels attached to longitudinal rails, according to an aspect of the present disclosure.
Figure 8:
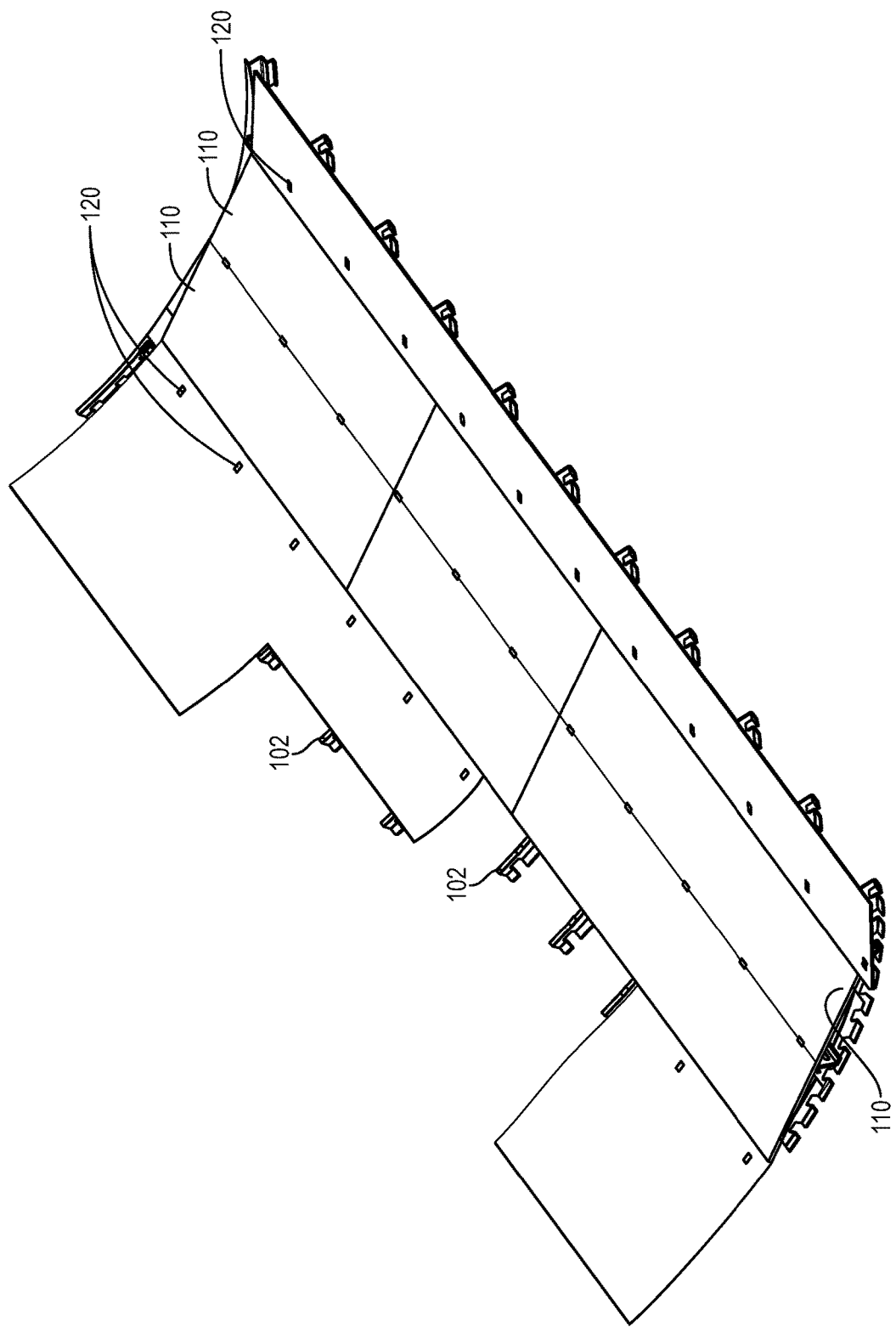
FIG. 8 illustrates a perspective view of a bulk cargo floor configuration with cargo floor panels and bulk cargo tie-down receptacles, according to an aspect of the present disclosure.

As mentioned above, the aircraft cargo floor architecture 100 can support a bulk loaded cargo floor, a containerized loaded cargo floor or a combination of both configurations simultaneously. Referring to FIG. 2A and FIG. 5, a bulk loaded cargo floor configuration can comprise bulk cargo floor panels 110 attached to the longitudinal rails 104. As shown more clearly in FIG. 4, bulk cargo tie-down receptacles 120 can be attached directly to the keel frames 102 using any suitable attachment mechanism, such as a bathtub fitting 106. Alternatively, the bulk cargo tie-down receptacles can be attached to any other desired structure that can provide suitable support, such as, for example, one or more of the longitudinal rails 104. FIG. 8 illustrates another perspective view of the bulk cargo configuration with the cargo floor panels 110 and bulk cargo tie-down receptacles 120.

Figure 6:
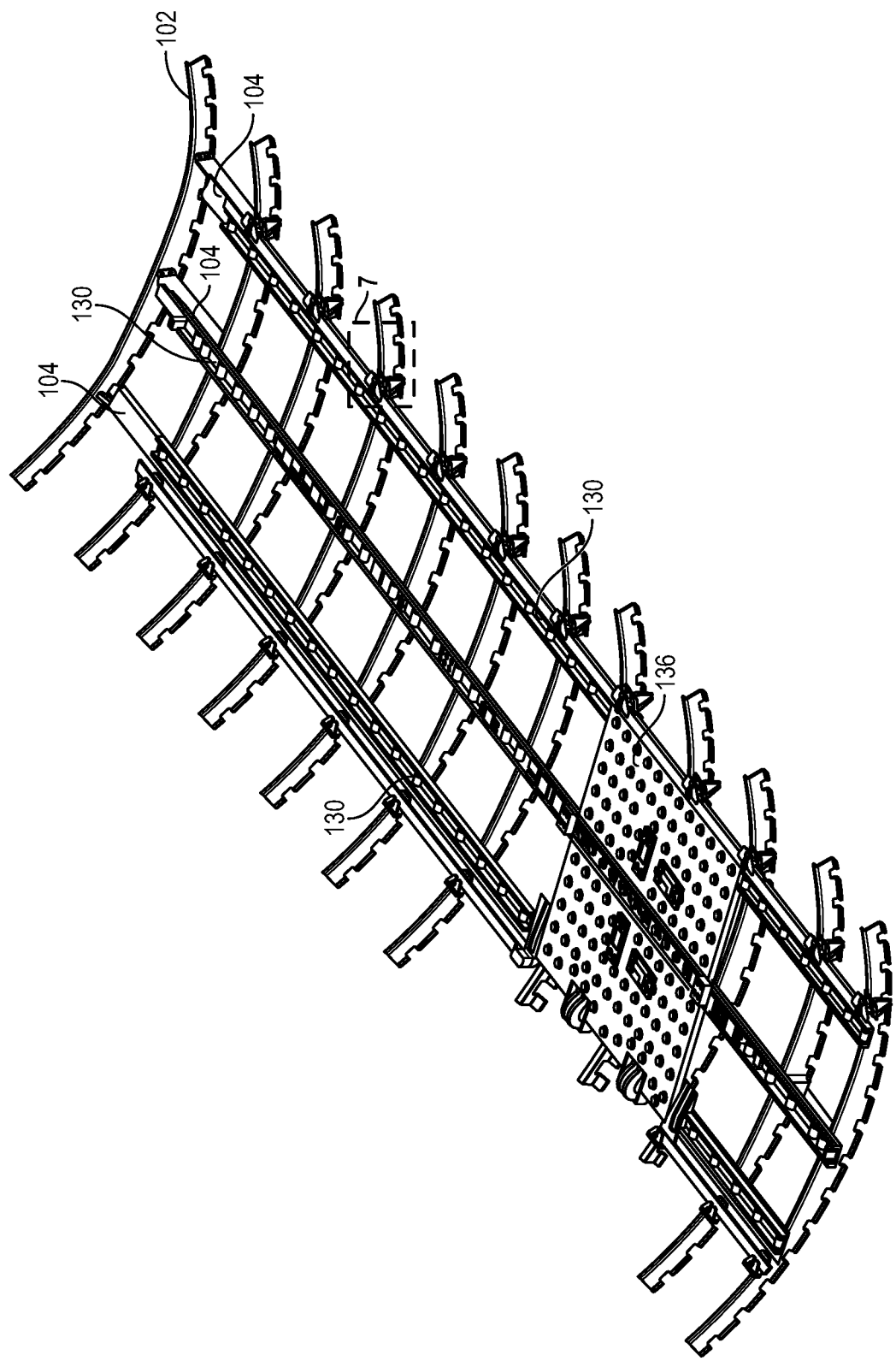
FIG. 6 illustrates a containerized loaded cargo floor comprising a plurality of roller trays attached to longitudinal rails, according to an aspect of the present disclosure.
Figure 7:
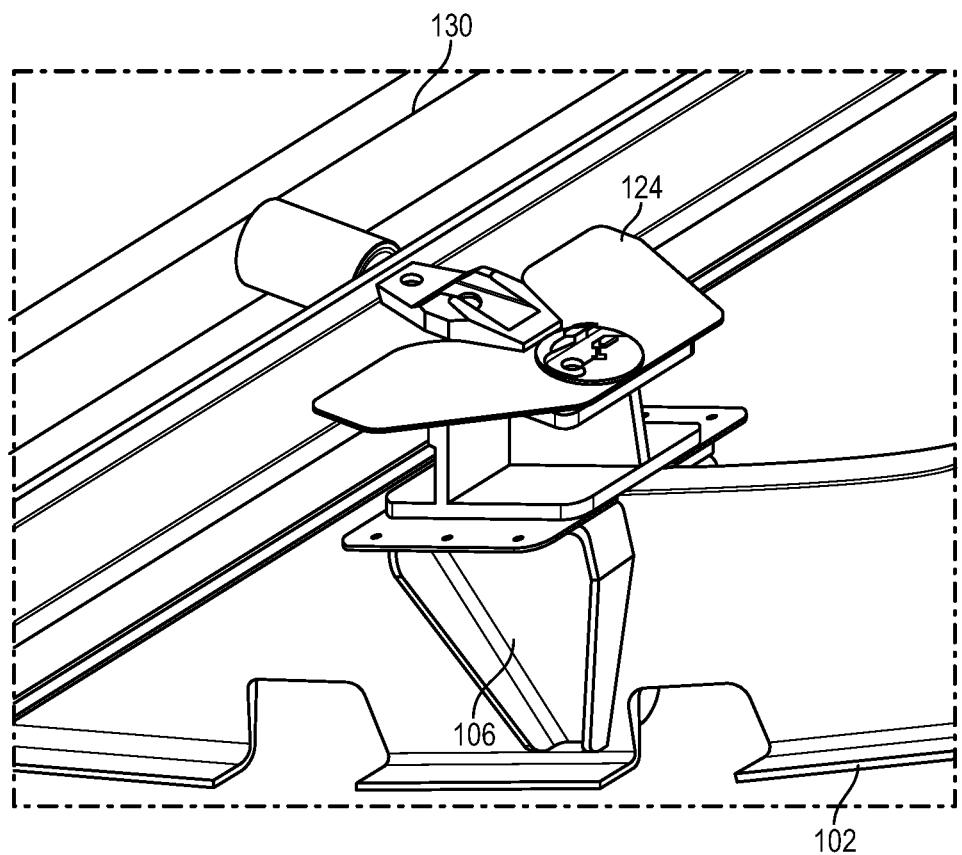
FIG. 7 illustrates a close-up view of side guide fittings attached to the keel frames of FIG. 6, according to an aspect of the present disclosure.

Referring to FIG. 2B and FIG. 6, the containerized loaded cargo floor configuration comprises a plurality of roller trays 130 attached directly to, and supported by, the longitudinal rails 104. For example, the roller trays 130 can be disposed in direct physical contact with the longitudinal rails 104, or can include, for example, an attachment mechanism or thermal isolator directly between the roller trays 130 and the longitudinal rails 104. The roller trays 130 can be attached to the longitudinal rails 104 by any suitable means, such as, for example, by using bolts with nutplates or other conventional means. A ball panel 136 can also be attached to the longitudinal rails 104. Ball panel 136 can be disposed proximate to a cargo loading door to allow ease of loading containerized cargo onto the aircraft, as is well known in the art. Side guides 122 for guiding the containers as they are loaded can be attached directly to the keel frames 102 using any suitable attachment mechanism, such as a bathtub fitting 106. An example side guide fitting 124, to which side guides 122 can be attached, is illustrated in FIG. 7. Alternatively, the side guide fittings 124 can be attached to any other desired structure that can provide suitable support, such as, for example, one or more of the longitudinal rails 104. Roller trays, ball panels and side guides are generally well known in the art of containerized cargo loading and one of ordinary skill would be able to design and/or select suitable roller trays, ball panels and side guides for use with the cargo floor architectures of the present disclosure.

Figure 9:
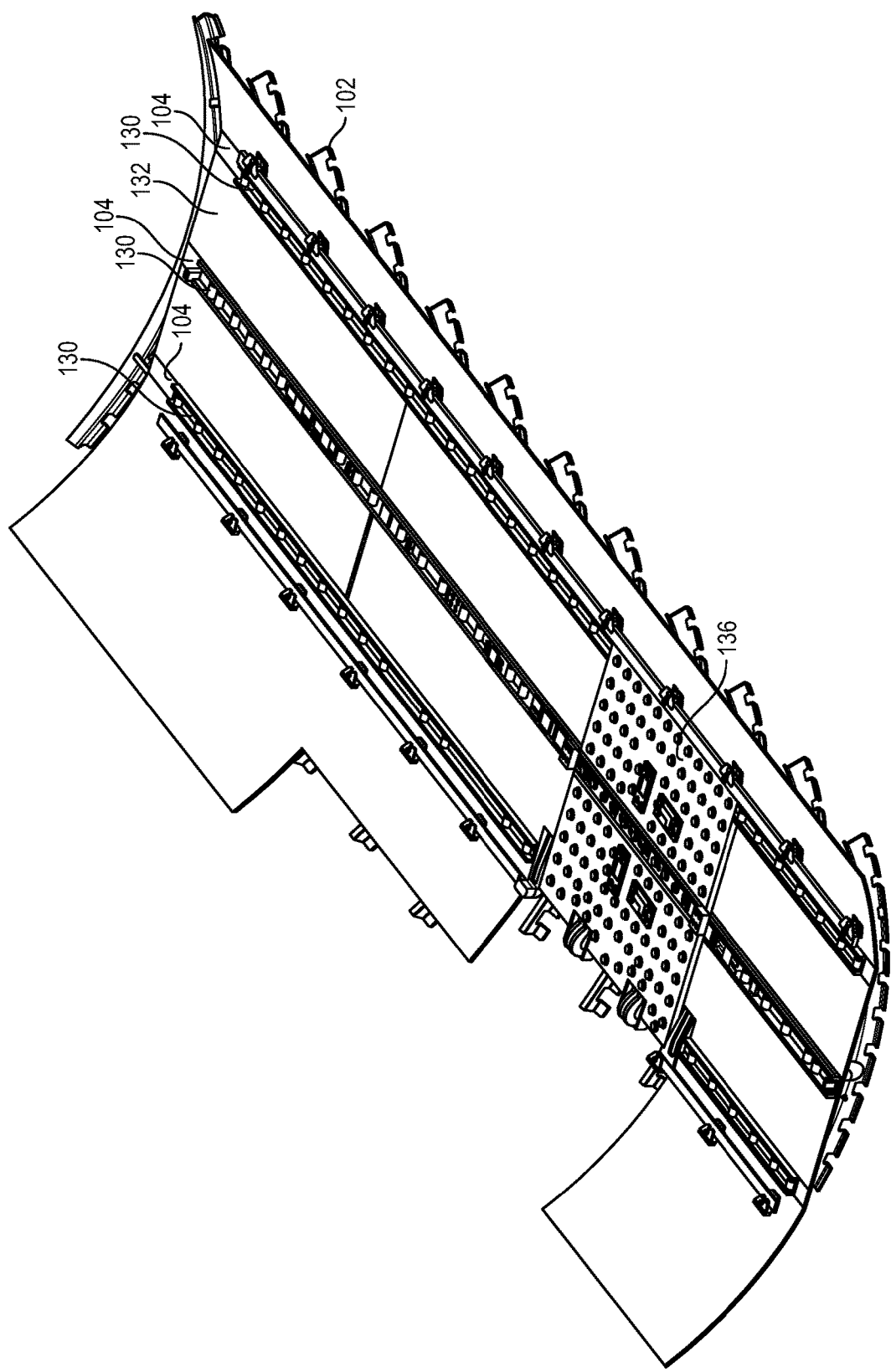
FIG. 9 illustrates containerized cargo floor panels and roller trays attached to longitudinal rails, according to an aspect of the present disclosure.

FIG. 6 illustrates a perspective view of the containerized cargo loading configuration without floor panels. Alternatively, as illustrated in FIG. 9, containerized cargo floor panels 132 can optionally be attached to the longitudinal rails 104 using any suitable attachment mechanism, such as, for example, by flanges 134 that are integral with, or attached to, the roller trays 130. The containerized cargo floor panels 132 can be designed as a walkway to support human weight, or can optionally be designed to support a heavier load of bulk cargo in the event bulk cargo is carried in addition to containerized cargo.

By employing the cargo floor architectures of the present disclosure, an entire aircraft can be fitted for containerized cargo or for bulk cargo. Alternatively, a portion of the aircraft can be fitted for containerized cargo and another portion of the aircraft fitted for bulk cargo.

The present disclosure is also directed to an aircraft cargo floor architecture quick change system. The system comprises the aircraft cargo floor architecture 100, as described herein, including a plurality of aircraft keel frames 102. One or more longitudinal rails 104 are attached directly to the aircraft keel frames 102, as described herein. The one or more longitudinal rails are designed to provide structural support for both a bulk cargo floor and a containerized cargo floor. Thus the system can include components chosen from bulk cargo floor panels 110, roller trays 130 or both, as described herein above.

Converting between bulk and containerized configurations can be accomplished without making structural changes to the support structure of the floor assembly, including any of the structure supporting the longitudinal rails 104. Instead, only cargo floor or cargo handling system parts, such as the bulk cargo floor panels, containerized floor panels, roller trays, side guides, side guide fittings and bulk cargo tie down receptacles can be changed out with relatively small costs and relatively quickly, such as in single day or two, or a few days, as examples.

Figure 10:
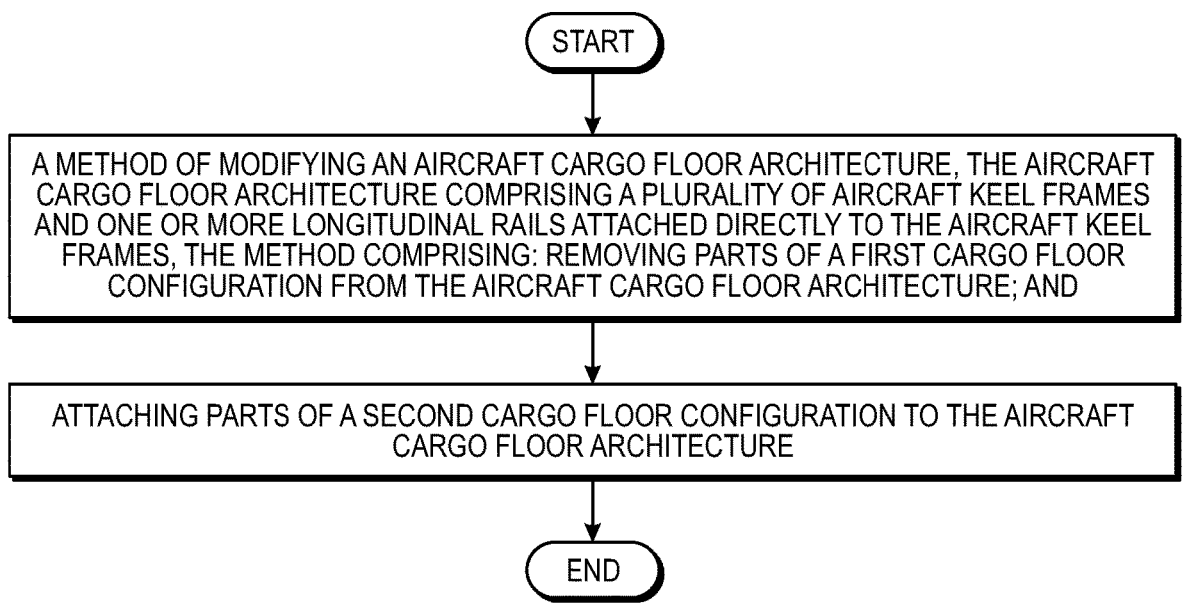
FIG. 10 is a flow diagram of a method for modifying an aircraft cargo floor configuration using the cargo floor architectures of the present disclosure.

The present disclosure is also directed to a method of modifying an aircraft cargo floor architecture, as shown in the flow diagram of FIG. 10. The aircraft cargo floor architecture comprises a plurality of aircraft keel frames 102 and one or more longitudinal rails 104 attached directly to the aircraft keel frames 102, as described herein above. The method comprising removing parts of a first cargo floor configuration from the aircraft cargo floor architecture. Parts of a second cargo floor configuration are then attached to the aircraft cargo floor architecture. In an example where the first cargo floor configuration is a bulk cargo floor, as described herein, and the second cargo floor configuration is a containerized cargo floor, as described herein, the method further comprising positioning roller trays directly on the longitudinal rails. In an example where the first cargo floor configuration is the containerized cargo floor and the second cargo floor configuration is the bulk cargo floor, the method further comprises removing roller trays that are positioned directly on the longitudinal rails. Modifying the aircraft cargo floor configuration in these methods can also include modifying the other cargo floor or cargo handling system parts of the floor configurations described herein, such as adding or removing bulk cargo floor panels, containerized floor panels, side guides, side guide fittings or bulk cargo tie-down receptacles. The one or more longitudinal rails provide structural support for both the bulk cargo floor and the containerized cargo floor. Thus, the modifying of the aircraft cargo floor architecture is carried out without modifying structural floor supports, including structural supports supporting the longitudinal rails 104, as described herein.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein.

While the present teachings have been illustrated with respect to one or more implementations, alterations and/or modifications can be made to the illustrated examples without departing from the spirit and scope of the appended claims. In addition, while a particular feature of the present teachings may have been disclosed with respect to only one of several implementations, such feature may be combined with one or more other features of the other implementations as may be desired and advantageous for any given or particular function. Furthermore, to the extent that the terms "including," "includes," "having," "has," "with," or variants thereof are used in either the detailed description and the claims, such terms are intended to be inclusive in a manner similar to the term "comprising." Further, in the discussion and claims herein, the term "about" indicates that the value listed may be somewhat altered, as long as the alteration does not result in nonconformance of the process or structure to the intended purpose described herein. Finally, "exemplary" indicates the description is used as an example, rather than implying that it is an ideal.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompasses by the following claims.

What is claimed is:

1. An aircraft cargo floor architecture, comprising:
a plurality of aircraft keel frames; and
three or more longitudinal rails disposed above, and attached directly to, the aircraft keel frames, the three or more longitudinal rails designed to provide structural support for an aircraft cargo floor, the three or more longitudinal rails including at least one inner longitudinal rail, a first outer longitudinal rail positioned on a first side of the at least one inner longitudinal rail and a second outer longitudinal rail positioned on a second side of the at least one inner longitudinal rail, a top of the at least one inner longitudinal rail being spaced farther from the aircraft keel frames than tops of the first and second outer longitudinal rails, and there being no intervening support beam or keel frame extension between the keel frames and the three or more longitudinal rails.

2. The cargo floor architecture of claim 1, wherein the keel frames are variable depth frames.

3. The cargo floor architecture of claim 1, further comprising a thermal isolator positioned between the three or more longitudinal rails and the aircraft keel frames.

4. The cargo floor architecture of claim 3, wherein the thermal isolator provides thermal protection by providing separation between the longitudinal rails and the aircraft keel frames.

5. The cargo floor architecture of claim 1, further comprising a plurality of roller trays attached directly to the longitudinal rails.

6. The cargo floor architecture of claim 5, further comprising side guides attached to the keel frames.

7. The cargo floor architecture of claim 1, further comprising bulk cargo floor panels attached to the longitudinal rails.

8. The cargo floor architecture of claim 7, further comprising bulk cargo tie-down receptacles attached to the keel frames.

9. The cargo floor architecture of claim 1, wherein the longitudinal rails are designed and sized to bear cargo loads ranging from about 30 pounds/inch to about 120 pounds/inch.

10. The cargo floor architecture of claim 1, wherein the top of the at least one inner longitudinal rail is spaced apart from a top edge of the aircraft keel frames.

11. The cargo floor architecture of claim 1, wherein the aircraft keel frames are curved with an inner portion of each aircraft keel frame being positioned below outer portions of each aircraft keel frame, wherein the at least one inner longitudinal rail extends upward from the aircraft keel frames a greater distance than the first and second outer longitudinal rails, and wherein the top of the at least one inner longitudinal rail is substantially level with the tops of the first and second outer longitudinal rails.

12. An aircraft cargo floor architecture system, comprising:
a plurality of aircraft keel frames; and
three or more longitudinal rails disposed above, and attached directly to, the aircraft keel frames, the three or more longitudinal rails including at least one inner longitudinal rail, a first outer longitudinal rail positioned on a first side of the at least one inner longitudinal rail and a second outer longitudinal rail positioned on a second side of the at least one inner longitudinal rail, a top of the at least one inner longitudinal rail being spaced farther from the aircraft keel frames than tops of the first and second outer longitudinal rails, and there being no intervening support beam or keel frame extension between the keel frames and the three or more longitudinal rails,
wherein the three or more longitudinal rails are designed to provide structural support for both a bulk cargo floor and a containerized cargo floor.

13. The cargo floor architecture system of claim 12, further comprising at least one component chosen from bulk cargo floor panels and roller trays.

14. The cargo floor architecture system of claim 12, wherein the keel frames are variable depth frames.

15. A method of modifying an aircraft cargo floor architecture, the aircraft cargo floor architecture comprising a plurality of aircraft keel frames and three or more longitudinal rails disposed above, and attached directly to, the aircraft keel frames, the three or more longitudinal rails providing structural support for an aircraft cargo floor, the three or more longitudinal rails including at least one inner longitudinal rail, a first outer longitudinal rail positioned on a first side of the at least one inner longitudinal rail and a second outer longitudinal rail positioned on a second side of the at least one inner longitudinal rail, a top of the at least one inner longitudinal rail being spaced farther from the aircraft keel frames than tops of the first and second outer longitudinal rails, and there being no intervening support beam or keel frame extension between the keel frames and the three or more longitudinal rails, the method comprising:
removing parts of a first cargo floor configuration from the aircraft cargo floor architecture; and
attaching parts of a second cargo floor configuration to the aircraft cargo floor architecture.

16. The method of claim 15, wherein the first cargo floor configuration is a bulk cargo floor and the second cargo floor configuration is a containerized cargo floor, the method further comprising positioning roller trays directly on the longitudinal rails.

17. The method of claim 15, wherein the first cargo floor configuration is a containerized cargo floor and the second cargo floor configuration is a bulk cargo floor, the method further comprising removing roller trays that are positioned directly on the longitudinal rails.

18. The method of claim 15, wherein the modifying of the aircraft cargo floor architecture is carried out without modifying structural floor supports.

19. An aircraft cargo floor architecture, comprising:
a plurality of aircraft keel frames; and
a plurality of longitudinal rails disposed above, and attached directly to, the aircraft keel frames, a top of an inner one of the longitudinal rails being spaced farther from the aircraft keel frames than a top of an outer one of the longitudinal rails, the longitudinal rails designed to provide structural support for an aircraft cargo floor, wherein the longitudinal rails comprise an assembly of a plurality of rail subsections connected together at rail joints, the rail joints configured to allow for flexing of the longitudinal rails at the rail joints.

20. An aircraft cargo floor architecture, comprising:
a plurality of aircraft keel frames; and
a plurality of longitudinal rails disposed above, and attached directly to, the aircraft keel frames, the longitudinal rails designed to provide structural support for an aircraft cargo floor, a top of an inner one of the longitudinal rails being spaced farther from the aircraft keel frames than a top of an outer one of the longitudinal rails, the plurality of aircraft keel frames comprising first adjacent keel frames and second adjacent keel frames, the longitudinal rails comprising first portions that span a distance between the first adjacent keel frames and second portions that span a distance between the second adjacent keel frames, an intercostal being disposed under each of the first portions of the longitudinal rails and an intercostal not being positioned under the second portions of the longitudinal rails.

* * * * *